March 16, 1937. A. C. FAVATT 2,073,612
NUT LOCK
Filed Sept. 21, 1935
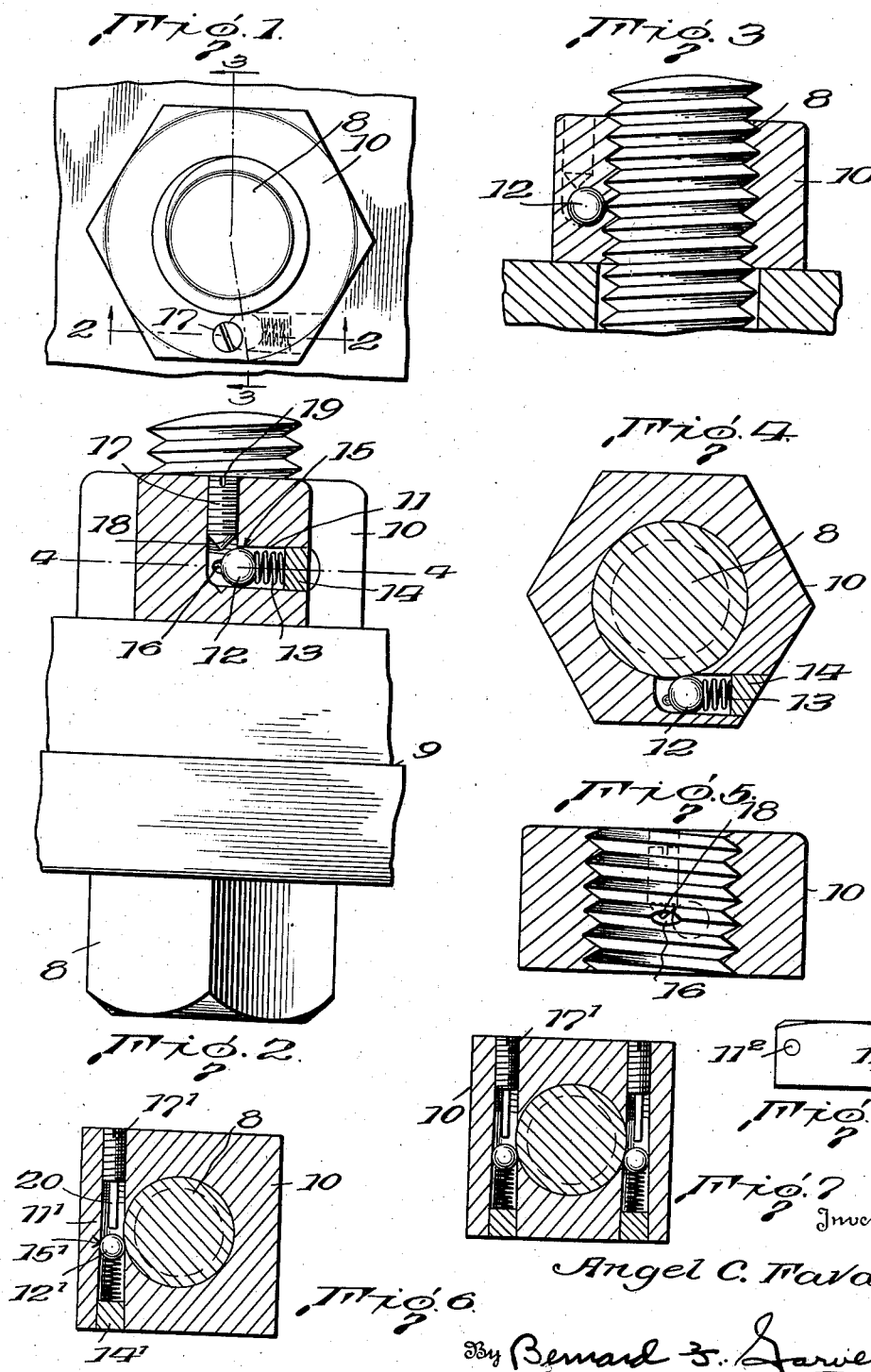

Patented Mar. 16, 1937

2,073,612

UNITED STATES PATENT OFFICE 2,073,612

NUT LOCK

Angel C. Favatt, Reno, Nev., assignor to Positive Lock Nut Corporation, a corporation of Nevada Application September 21, 1935, Serial No. 41,617

2 Claims. (Cl. 151—25)

It is well known in the art to provide nut locks of various miscellany and the present invention is designed to improve certain types of the so called side clutchlocks to correct manufacturing and operating defects and to provide a positive lock of simple construction capable of use with any standard type of nut and bolt.

It is further within the contemplation of this invention to provide a nut lock which is arranged at a point of convenient accessibility to permit facile locking and unlocking of the nut.

It is a further object of this invention to provide a nut lock wherein the nut is provided with a tangential slot which opens into its bore, so that a detent mounted in the recess may impinge the threads of a bolt with which the nut is engaged, care being exercised to constrict the nut recess near the point where it opens into the nut bore to retain the detent at all times on one side of the longitudinal axis of the bolt which prevents the detent from jamming and permits convenient release thereof at the option of the user.

Other objects will be apparent from the consideration of the drawing, wherein:—

Fig. 1 is a plan view of a nut and bolt illustrating the application of a preferred form of my nut lock.

Fig. 2 is a longitudinal sectional view taken on the line 2—2 of Fig. 1 looking in the direction of the arrows, showing the details of the locking means.

Fig. 3 is a cross sectional view taken on the line 3—3 of Fig. 1 looking in the direction of the arrows, illustrating the manner of engaging the locking ball with the threads of the bolt.

Fig. 4 is a transverse sectional view taken on the line 4—4 of Fig. 2 looking in the direction of the arrows, illustrating the manner of mounting the spherical detent in the nut.

Fig. 5 is a vertical sectional view of the nut per se, showing the detent recess opening into the nut bore.

Fig. 6 is a cross sectional view through the nut and bolt showing a modified form of locking means.

Fig. 7 is a similar view showing a further modified form of lock, and

Fig. 8 is a side elevational view of the nut shown in Fig. 7.

In order to illustrate the application of my invention, I have shown a bolt 8 of conventional design mounted in an operative position through work elements 9. The bolt is adapted to be engaged by a nut 10 also of conventional design except for the particular locking means of my invention.

One form of locking means, as illustrated in Figs. 1 to 5, inclusive, in the drawing, consists in providing a recess 11 in the nut, the recess opening through the outer face of the nut and extending thereinto to a point approximately midway the nut faces where it turns at right angles extending to one of the sides of the nut tangential to the bore of the latter. A rectangular recess is in this way provided, the horizontal portion of which is adapted for the reception of a yieldable detent, which in the present instance consists of a ball 12 which is engaged by one end of a coil spring 13. The opposite end of the spring impinges against a plug 14, which latter fills the outer terminal of the recess at the side of the nut, as illustrated to advantage in Figs. 2 and 4. Of the essence of importance in the present invention is a stricture 15 formed in the horizontal portion of the recess 11 adjacent the juncture of the horizontal and vertical portions of the recess. The stricture is formed by contracting the walls of the recess so as to limit the extent of movement of the ball 12 for a purpose more fully hereinafter set forth. The recess 11, at the juncture of the angle thereof, opens through the nut bore, as indicated at 16, through which a portion of the periphery of the ball is adapted to project for engagement with threads of the bolt 8, as illustrated to advantage in Fig. 3.

It is manifest from the above description that the ball 12 is normally urged into engagement with the threads of the bolt under the expansive action of the spring 13. This prevents movement of the nut in one direction, but allows movement in the opposite direction. To permit movement of the nut in either direction on the bolt, a suitable ball displacing means is provided which in the present instance consists of a screw 17, the outer periphery of the screw being threaded. The inner end of the screw is extended and tapered to provide a conical terminal 18. The opposite end of the crew is provided with a kerf 19 for the reception of a screw driver or like instrument in a manner well known in the art. If the screw 17 is fed inwardly in the nut, the conical terminal 18 thereof will engage the ball 12, and urge the latter away from the opening 16, against the resistance of the spring 13.

I have found after much experimentation that the lock above described is positive in its operation yet will not jam to the extent that disengagement of the ball from the threads is rendered impossible or difficult. Provision of the stricture 15 renders it impossible for the ball to move into a position directly beneath the displacing means 17, consequently, the latter is available at all times to displace the detent or ball from the nut. Furthermore, by mounting the displacing means in the outer face of the nut, this means is always readily accessible.

In the form of invention shown in Fig. 6 of the drawing, I provide a tangential opening 11' which extends completely across the nut and opens into the bore of the latter. One end of the recess is closed by a plug 14'. A spring detent 12' is mounted at the plugged end of the recess, while in the opposite end of the latter, I adjustably mount a displacement means 17' consisting of a screw having an extended shank 20 on its inner end. The terminal of said shank is adapted to engage the ball of the spring detent 12' to displace the latter. The inner end of the detent receiving portion of the recess 11' is tapered to provide a stricture 15' which serves in the same capacity as the stricture 15 in the form of invention shown in Figs. 1 to 5. This construction prevents the ball of the detent to extend beyond a line drawn parallel to the longitudinal axis of the bolt thereby preventing jamming of the ball of the detent, yet providing a positive locking means. In the form of invention shown in Fig. 6, it is manifest that the nut is locked from movement in one direction only, movement in the opposite direction being permitted, regardless of the position of the detent. When the detent is in a locked position, displacement thereof is effected by operation of the displacement means 17' in an obvious manner.

The modified form of invention shown in Fig. 7 of the drawing is identical to that shown in Fig. 6, but the locking and releasing means illustrated in Fig. 6 is duplicated and arranged to lie in parallelism to one another in the nut. Furthermore, as illustrated to advantage in Fig. 8 of the drawing, recesses 11² are provided which are biplanar to positively engage the spring detents of the locks with the periphery of a thread on opposite sides of the latter. When the detents, shown in Fig. 7 of the drawing are engaged with a thread of the bolt, movement of the latter in either direction is prohibited. This form of lock nut is adapted for use where the nut is to be held stationary. Release of the nut is effected in a manifest manner.

I have found that the particular positioning of the ball detents is of extreme importance in a nut lock of this type to make the detent effective as a lock, yet preventing jamming thereof, and likewise preventing casual displacement.

While I have herein described preferred forms of my invention, I am aware that various changes may be made in the details of construction, proportion and arrangement of parts within the scope of the claims herewith appended.

What is claimed is:

1. In combination with a nut and bolt, the nut having a recess beginning at one face of the nut and extending parallel to the bore of the latter, said recess continuing at right angles tangentially to the nut bore in communication with the latter, a yieldable bolt engaging spherical detent mounted in the tangential portion of said recess, and a screw mounted in the portion of the recess which parallels the nut bore, the inner end of the screw being cone shape to facilitate its movement over the periphery of the detent, said detent being positioned in offset relation with reference to the screw to permit lateral displacement of the detent away from the bolt.

2. In combination with a nut and bolt, the nut having a recess beginning at one face of the nut and extending parallel to the bore of the latter, said recess continuing at right angles tangentially to the nut bore in communication with the latter, a yieldable bolt engaging spherical detent mounted in the tangential portion of said recess, and a screw mounted in the portion of the recess which parallels the nut bore for displacing the detent, the tangential portion of the recess being constricted at the juncture of the parallel recess to prevent the detent from being forced completely into the latter and to bring the detent in off center position with reference to the screw.

ANGEL C. FAVATT.